(12) United States Patent
Aoki

(10) Patent No.: US 7,318,954 B2
(45) Date of Patent: Jan. 15, 2008

(54) HONEYCOMB STRUCTURE

(75) Inventor: Takashi Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 340 days.

(21) Appl. No.: 11/052,225

(22) Filed: Feb. 8, 2005

(65) Prior Publication Data

US 2005/0186389 A1    Aug. 25, 2005

(30) Foreign Application Priority Data

Feb. 19, 2004    (JP) ............... 2004-042597

(51) Int. Cl.
*B32B 3/12*    (2006.01)

(52) U.S. Cl. .................................. 428/116

(58) Field of Classification Search ............... 428/116, 428/118, 188; 55/523

See application file for complete search history.

(56) References Cited

U.S. PATENT DOCUMENTS 5,098,763 A * 3/1992 Horikawa et al. .......... 428/116

2004/0137194 A1 * 7/2004 Fukao et al. ............... 428/116

FOREIGN PATENT DOCUMENTS

| JP | 50-77291 | 6/1975 |
| JP | 53-152012 | 11/1978 |
| JP | A 54-110189 | 8/1979 |
| JP | A 54-150406 | 11/1979 |
| JP | A 55-147154 | 11/1980 |
| JP | A 2-40239 | 2/1990 |
| WO | WO 98/05602 A1 | 2/1998 |

* cited by examiner

*Primary Examiner*—Jennifer C. McNeil
*Assistant Examiner*—Gordon R. Baldwin
(74) *Attorney, Agent, or Firm*—Oliff & Berridge, PLC

(57) ABSTRACT

There is provided a honeycomb structure 1 having partition walls 2 to form cells 3 extending in the axial direction and having a polygonal section, and an outer wall 4 surrounding the plurality of partition walls 2. The partition walls 2 have an average thickness (Tp) of 0.038 to 0.17 mm. The outer wall 4 has an average thickness (Ts) satisfying a relation of Tp<Ts≦0.7 mm. The outer wall 4 has a concave and convex structure at its outer surface 40. The convex top 7 is located at the outer surface 41 of an abutting portion 5 or the outer surface 42 of abutting portion vicinity 9. The honeycomb structure sufficiently withstands the pressure applied during canning and also has excellent thermal shock resistance.

6 Claims, 5 Drawing Sheets

PRESSURE

HONEYCOMB STRUCTURE

BACKGROUND OF THE INVENTION AND RELATED ART STATEMENT

The present invention relates to a honeycomb structure. More particularly, the present invention relates to a honeycomb structure which can be suitably used, for example, as a catalyst carrier in the catalytic converter for exhaust gas purification, of internal combustion engine (e.g. automobile engine).

Honeycomb structures are in wide use in filters, catalyst carriers, etc. and are being used in large amounts particularly as a catalyst carrier in the catalytic converter for exhaust gas purification, of internal combustion engine (e.g. automobile engine), a filter for exhaust gas purification, of diesel engine, etc.

In such applications, the honeycomb structure is used by being held in a can or the like via a holding material, in some cases. In such cases, the honeycomb structure need be held at a given strength in order to avoid the slip between the can and the honeycomb structure which may occur during the actual use of the canned honeycomb structure, and the honeycomb structure is required to have an isostatic strength to withstand such holding. In such applications, the honeycomb structure is further required to have thermal shock resistance because the honeycomb structure is subjected to frequent heating and cooling.

In consideration of increasing environmental problems, the regulation for exhaust gases is becoming increasingly stricter. To respond thereto, the catalyst for exhaust gas purification made of a honeycomb structure catalyst carrier, used in the catalytic converter for exhaust gas purification, of automobile or the like needs to have higher purification ability. On the other hand, in engine development, lower fuel consumption and higher output are being aimed clearly; in respond to such movement, the catalyst for exhaust gas purification is also required to give a lower pressure loss.

Hence, in order to satisfy such requirements, such a movement is becoming increasingly strong that the honeycomb structure is allowed to have even smaller thicknesses in the partition walls and the outer wall so that the gas flow therethrough becomes easier, the pressure loss thereof becomes lower, and further the exhaust gas purification catalyst made thereof becomes lighter for smaller heat capacity and increased purification ability during engine warm-up.

In order to solve the problem of the reduction in strength of honeycomb structure, associated with the thinning of partition walls, there was proposed a honeycomb structure in which the thicknesses of partition walls are made smaller regularly toward the center of the cross-section (for example, JP-B-1979-110189). There was also proposed a honeycomb structure in which the partition wall thicknesses of peripheral portion are made larger than those of interior portion (for example, JP-A-1979-150406 and JP-A-1980-147154). There was further proposed a ceramic-made honeycomb structure in which, in order to inhibit from chipping of edge during handling, the average thickness of partition walls is set at 0.05 to 0.13 mm, the average thickness of outer wall is made larger than the average thickness of partition walls, and the relation between partition wall and the average contact width W of outer wall is W>T and $0.7 \geq W \geq -(T/4)+0.18$ (for example, WO 98/05602). There was also disclosed a honeycomb structure in which each cell is a hexagon and the outer wall is covered with a reinforcing material (for example, JP-A-1975-77291). These honeycomb structures, however, are unable to satisfy canning characteristic and thermal shock resistance at the same time.

SUMMARY OF THE INVENTION

The present invention is characterized in providing a honeycomb structure which sufficiently withstands the pressure applied during canning and also has excellent thermal shock resistance.

The present invention provides a honeycomb structure comprising:
a plurality of partition walls provided so as to form a plurality of cells extending in an axial direction of the honeycomb structure and having a polygonal section normal to the axial direction; and
an outer wall surrounding said plurality of partition walls, wherein
the partition walls have an average thickness (Tp) of 0.038 to 0.17 mm,
the outer wall has an average thickness (Ts) satisfying a relation of $Tp<Ts \leq 0.7$ mm, and
the outer wall has a concave and convex structure showing a concave and convex shape at its outer surface in the section of the honeycomb structure normal to the axial direction,
a convex top being located at an outer surface of an abutting portion or an abutting portion vicinity,
the abutting portion being a part of the outer wall where the partition wall abuts the outer wall,
the abutting portion vicinity being a part of the outer wall present at each side of the abutting portion with a width of Tp.

In the present invention, it is preferred that a concave bottom is located at an outer surface of an intermediate portion, which is a part of the outer wall present between two neighboring abutting portions It is also preferred that, in the above-mentioned section, the concave and convex structure satisfies a relation of 0.8 Cp<P<2.2 Cp, where "P" is a pitch from one convex top to the next convex top, and "Cp" is an average cell pitch from one partition wall to the next partition wall. It is also preferred that, in the section, the concave and convex structure satisfies a relation of 15 μm<h<Ts, where "h" is a height difference between one convex top and the adjacent concave bottom. It is further preferred that the concave and convex structure occupies at least 10% of the total length of the outer surface of the outer wall in said section.

The honeycomb structure of the present invention can have higher thermal shock resistance by having a smaller difference between the partition wall thickness and the outer wall thickness, and moreover can have higher canning characteristic by having, at the outer surface of the outer wall, a concave and convex structure wherein the convex area is formed at either of the outer surfaces of the abutting portion and the vicinities thereof.

Figure 1A:
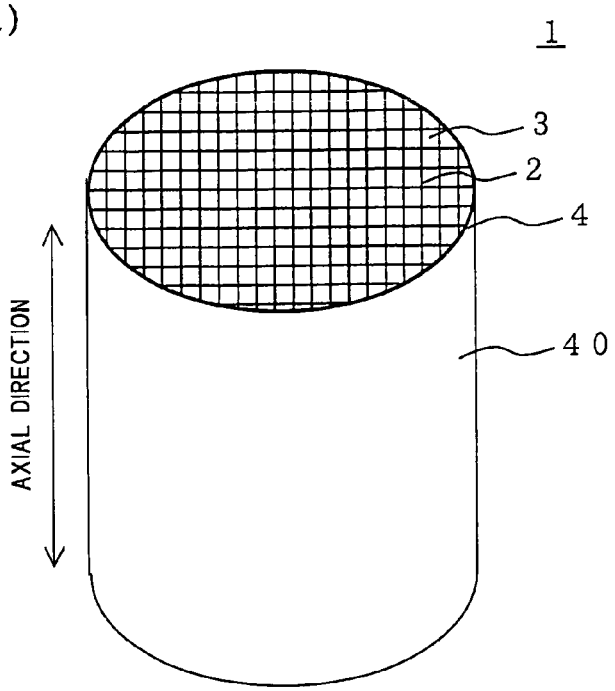
FIG. 1(a) is a schematic perspective view showing an embodiment of the honeycomb structure of the present invention.

In these Figures, individual numerals refer to the followings.

1: honeycomb structure; 2, $2_1$, $2_2$: partition walls; 3: cell; 4: outer wall; 5, $5_1$, $5_2$: abutting portions; 6, $6_1$: concave bottoms; 7, $7_1$, $7_2$: convex tops; 8: intermediate portion; 9: abutting portion vicinity; 10: mat; 40: outer surface of outer wall; 41: outer surface of abutting portion; 42: outer surface of abutting portion vicinity.

PREFERRED EMBODIMENTS OF THE INVENTION

The present invention is described below on preferred embodiments. However, the present invention is in no way restricted to the following embodiments. Incidentally, in the following, the section of honeycomb structure means a section normal to the axial direction of the honeycomb structure, unless otherwise specified. an embodiment of the honeycomb structure according to the present invention, and FIG. 1(b) is a partly enlarged schematic sectional view thereof. The honeycomb structure 1 shown in FIGS. 1(a) and 1(b) has a plurality of partition walls 2 provided so as to form a plurality of cells 3 extending in the axial direction of the honeycomb structure and having a tetragonal section, and an outer wall 4 surrounding the plurality of partition walls 2. In this honeycomb structure 1, the average thickness (Tp) of the partition walls 2 is in a range of 0.038 to 0.17 mm, and the average thickness (Ts) of the outer wall 4 is larger than Tp but not larger than 0.7 mm. Further, the outer wall 4 has a concave and convex structure showing a concave and convex shape at the outer surface 40 in the section of the honeycomb structure 1, and the convex top 7 is located at either of the outer surface 41 of the abutting portion 5 and the outer surfaces 42 of two abutting portion vicinities 9. The abutting portion 5 is a part of the outer wall 4 where the partition wall 2 abuts the outer wall 4. The abutting portion vicinity 9 is a part of the outer wall 4 present at the each side of the abutting portion 5 with a width of Tp.

Figure 10:
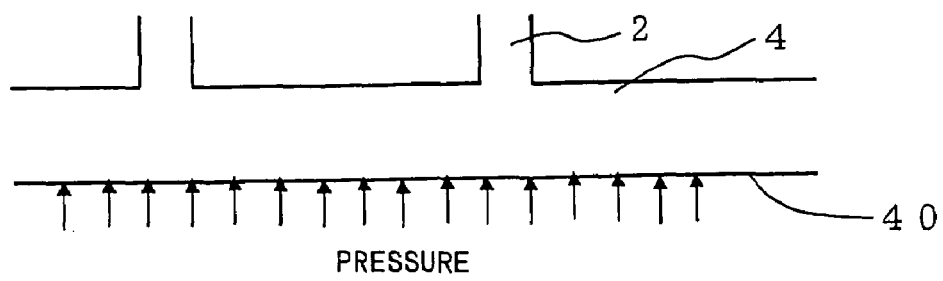
FIG. 10 is a partially enlarged schematic sectional view showing a conventional honeycomb structure.

In FIG. 10 is shown part of the section of a conventional honeycomb structure. When this conventional honeycomb structure shown in FIG. 10 is subjected to canning and a pressure is applied thereto from outside the outer wall 4 thereof, the outer wall 4 undergoes a load normal thereto, uniformly. In order for the honeycomb structure to be able to withstand the pressure, the outer wall 4 needs to have a sufficiently large thickness. However, an increased thickness of outer wall 4 results in a larger difference in thickness between the partition wall 2 and the outer wall 4 and accordingly invites a larger difference in heat capacity between the two. As a result, the temperature difference between them during heating and cooling becomes larger, whereby a large thermal stress is generated and a reduction in thermal shock resistance is invited.

Figure 1B:
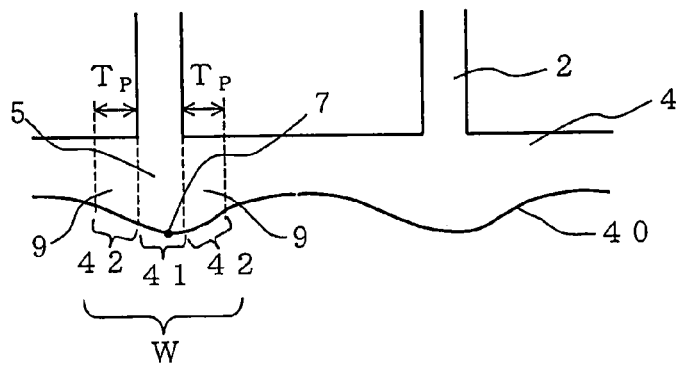
FIG. 1(b) is a partially enlarged schematic sectional view thereof.
Figure 2:
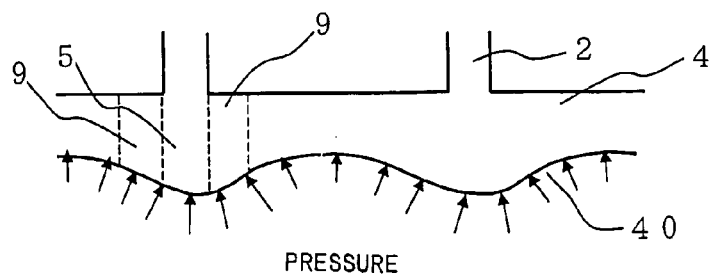
FIG. 2 is a partially enlarged schematic sectional view showing another embodiment of the honeycomb structure of the present invention.

On the other hand, in the honeycomb structure 1 shown in FIGS. 1(a) and 1(b), the outer surface 40 of the outer wall 4 has a concave and convex structure, and the convex top 7 is located at the outer surface 41 of the abutting portion 5 or the outer surface 42 of the abutting portion vicinity 9, that is, in a range of W in FIG. 1(b). Therefore, when this honeycomb structure 1 is subjected to canning and a pressure is applied thereto from outside the outer wall 4 thereof, the pressure acts normally to the outer surface 40 of the outer wall 4, as shown in FIG. 2; as a result, stress can be concentrated at the abutting portion 5 and the abutting portion vicinities 9, each having high strength. Therefore, a sufficient isostatic strength can be obtained even when the thickness of the outer wall is restricted. Incidentally, a honeycomb structure having surface unevenness at the outer circumference is shown in FIG. 2 of JP-A-1975-77291. In this surface unevenness, each concave area is located at the portion of outer wall where a partition wall abuts the outer wall, and the surface unevenness has a structure reverse to that of the present invention. Therefore, with this surface unevenness, stress concentration at abutting portion of high strength is impossible and no effect such as mentioned above is obtainable.

Figure 3:
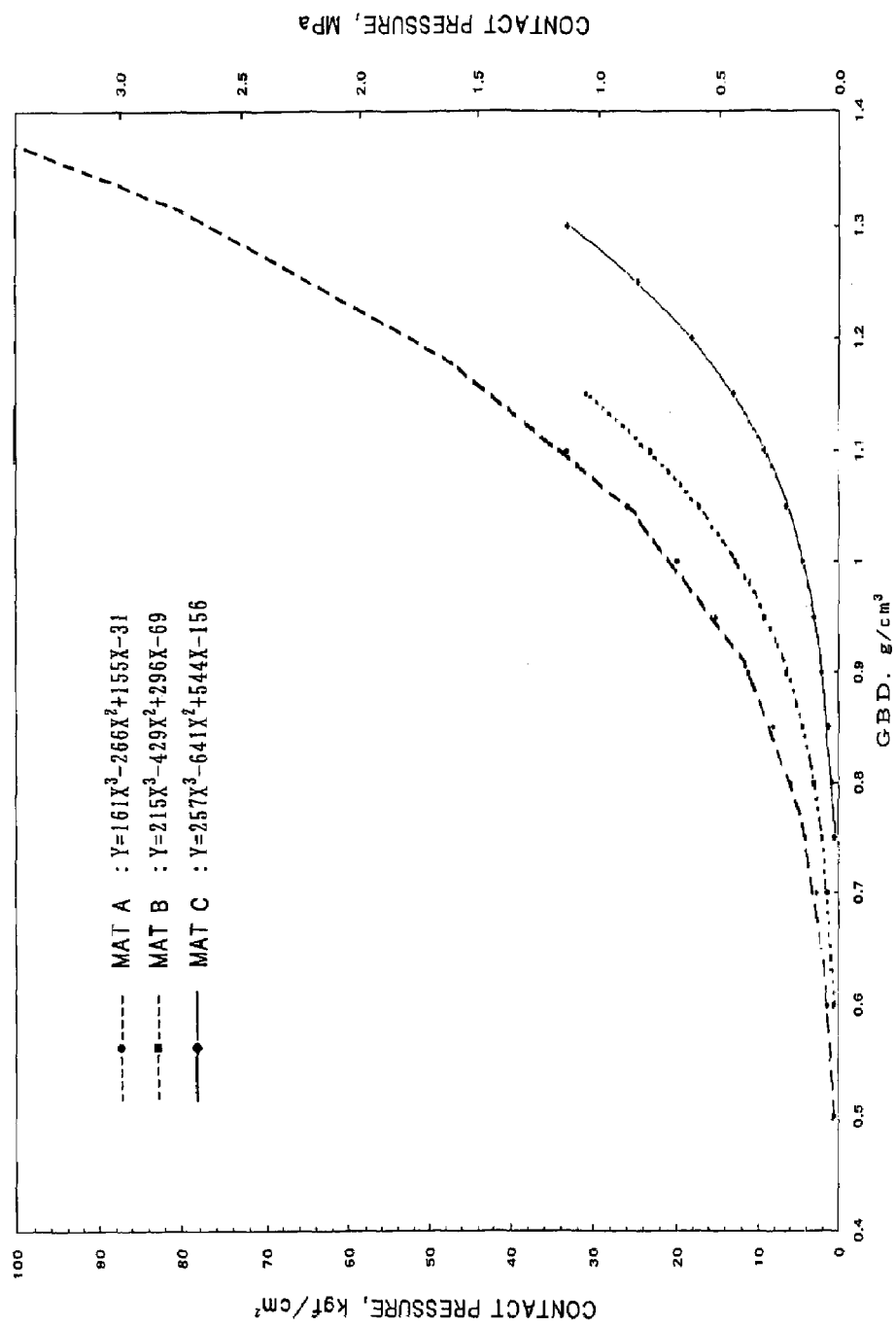
FIG. 3 is a graph showing the compression properties of mats.

When a honeycomb structure is subjected to canning, ordinarily the honeycomb structure is wound round a mat and then inserted into a can and thereby held therein. In this case, examples of relations between the compression degree of mat, i.e. GBD (gap bulk density) and the contact pressure applied to honeycomb structure are shown in FIG. 3. As shown in FIG. 3, the contact pressure increases as a cubic function of the compression degree of mat. Therefore, in a highly compressed state of mat, even a small difference in compression degree gives a large influence on the contact pressure. Incidentally, the GBD indicates the bulk density of mat after canning and is determined by the following formula.

$$GBD\ (g/cm^3) = weight\ (g/cm^2)\ of\ mat\ per\ unit\ area / gap\ (cm)\ between\ honeycomb\ structure\ and\ can$$

Figure 4:
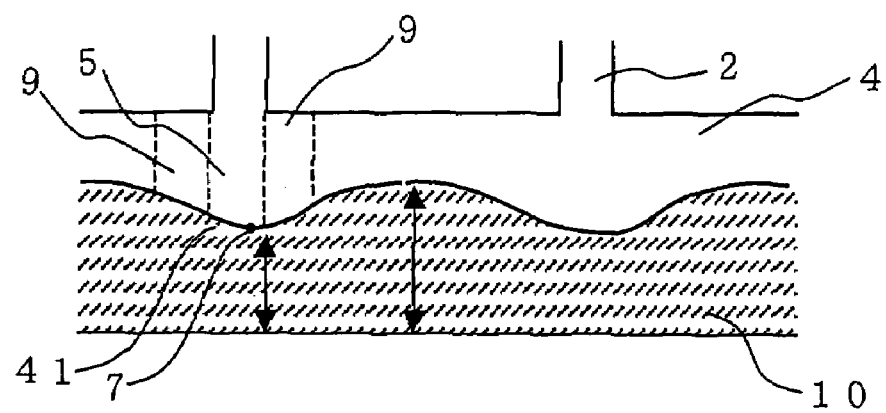
FIG. 4 is a partially enlarged schematic sectional view showing still another embodiment of the honeycomb structure of the present invention.

Therefore, by making larger, as shown in FIG. 4, the compression degree of mat 10 at the outer surfaces of the abutting portion 5 and abutting portion vicinities 9 all of higher strength, the pressure applied to the abutting portion 5 and abutting portion vicinities 9 can be made larger than the pressure applied to the other portion of outer wall, and the breakage of honeycomb structure due to excessive pressure can be inhibited while a sufficient holding force is being maintained. From the standpoint of further inhibition of breakage during canning, the convex top 7 is located more preferably at the outer surface 41 of the abutting portion 5.

Owing to such a concave and convex structure, it is further possible to inhibit the rotational direction slip of honeycomb structure in can (casing), caused by, for example, vibration during actual use. In recent years, it has increased to form a groove or a hole in a honeycomb structure and insert a sensor therein to; in such a honeycomb structure, slip of honeycomb structure in rotational direction causes a problem of contact between the honeycomb structure and the sensor. A honeycomb structure shown in FIG. 4, having a circular section having a concave and convex structure at the outer circumference can inhibit the above-mentioned slip, as compared with ordinary honeycomb structures having a circular section. Incidentally, the problem of such slip of honeycomb structure in rotational direction and the structure capable of inhibiting the slip are disclosed in, for example, JP-A-1978-152012 and JP-A-1990-40239.

Figure 5:
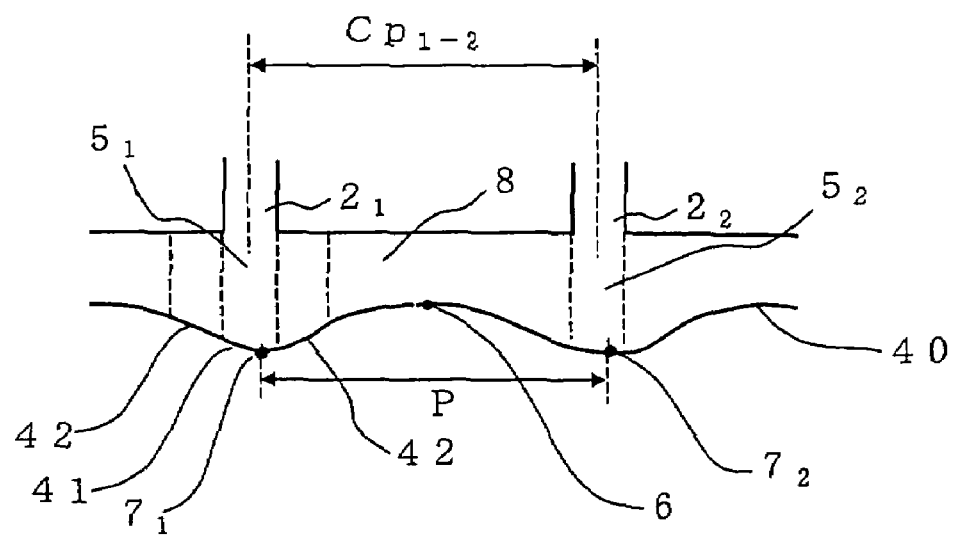
FIG. 5 is a partially enlarged schematic sectional view showing still another embodiment of the honeycomb structure of the present invention.

In the present invention, it is preferred that, as shown in FIG. 5, the concave bottom 6 is located at the outer surface of the intermediate portion 8, which is a part of the outer wall present between two neighboring abutting portions $5_1$ and $5_2$. By employing such a constitution, the compression degree of a part of a mat located in the position corresponding to the intermediate portion 8 having lower strength can be made smaller and the breakage of honeycomb structure during canning can be inhibited more effectively.

Incidentally, as shown in, for example, FIG. 5, each of the convex tops $7_1$ and $7_2$ means a point at which, in the section of honeycomb structure, the outer surface 40 of outer wall 4, i.e. the sectional contour of honeycomb structure gives the local maximum in the radial direction of honeycomb structure; and concave bottom 6 means a point at which the sectional contour gives the local minimum in the radial direction.

It is further preferred that, as shown in FIG. 5, the concave and convex structure satisfies a relation of $0.8\ Cp < P < 2.2\ Cp$ when the pitch from one convex top 71 to next convex top $7_2$ is expressed as "P" and the average of cell pitch ($Cp_{1-2}$) from one partition wall $2_1$ to next partition wall $2_2$ is expressed as "Cp". By satisfying such a relation, a plurality of convex tops $7_1$ and $7_2$ can be provided at the outer surface 41 of each abutting portion or at the outer surface 42 of each abutting portion vicinity, whereby the effect of the present invention can be made larger.

Further, it is preferred that, in the section of the present honeycomb structure, the concave and convex structure occupies at least 10%, preferably at least 15%, particularly preferably at least 20% of the total length of the outer wall surface.

Figure 6:
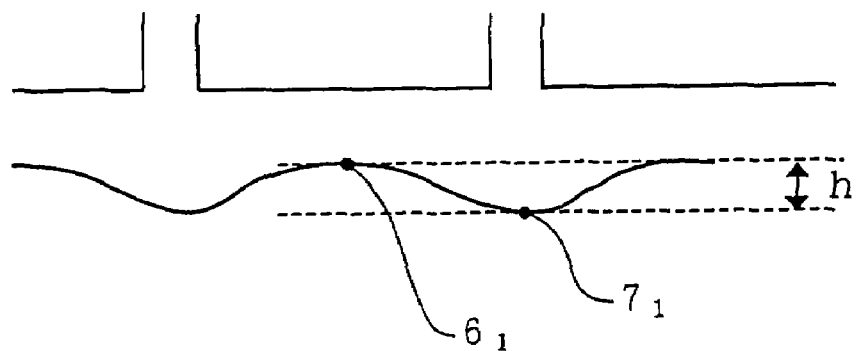
FIG. 6 is a partially enlarged schematic sectional view showing still another embodiment of the honeycomb structure of the present invention.

As to the height difference (h) between one convex top $7_1$ and a concave bottom $6_1$, adjacent thereto, which is shown in FIG. 6, there is no particular restriction. However, too small a height difference h is not preferred because the obtained effect of canning characteristic is too small. Therefore, h is preferably larger than 15 μm, more preferably larger than 25 μm. Meanwhile, too large a height difference (h) is not preferred because the section modulus of concave area decreases and resultantly the maximum bending stress of the concave area increases. Therefore, the height difference (h) is preferably smaller than the average thickness (Ts) of outer wall, more preferably smaller than 70% of Ts.

Figure 7:
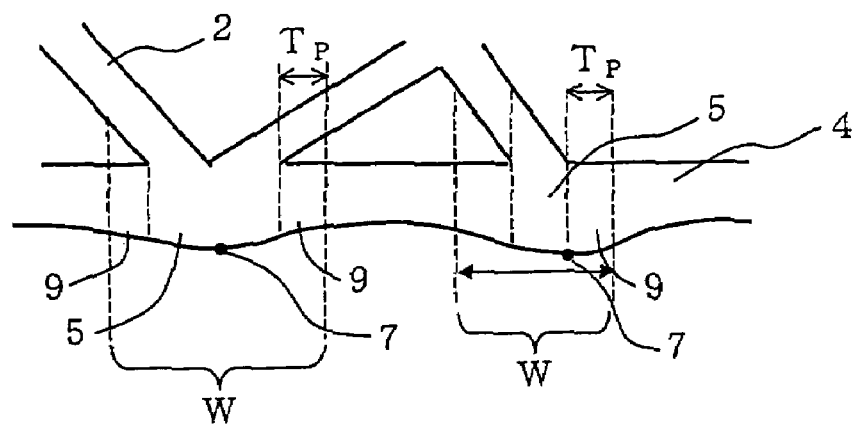
FIG. 7 is a partially enlarged schematic sectional view showing still another embodiment of the honeycomb structure of the present invention.

In FIG. 7 is shown another form of the concave and convex structure. As shown in FIG. 7, there are cases that the partition wall 2 abuts the outer wall 4 obliquely, depending upon the cell structure of honeycomb structure and the position of peripheral portion of honeycomb structure. Even in such cases, when the honeycomb structure has a concave and convex structure such as shown in FIG. 7, increases in thermal shock resistance and canning characteristic can be obtained. Also, there are cases that two or more partition walls abut the outer wall at one position, or in a partially overlapping state, or at near positions. Even in such cases, the abutting portion 5 is a part of the outer wall 4 where each partition wall 2 abuts the outer wall 4; two abutting portion vicinities 9 mean the both sides of the abutting portion 5, each having a width of Tp; and it is sufficient that the convex top 7 is located in a range of "W".

Figure 8:
FIG. 8 is a partially enlarged schematic sectional view showing still another embodiment of the honeycomb structure of the present invention.
Figure 9:
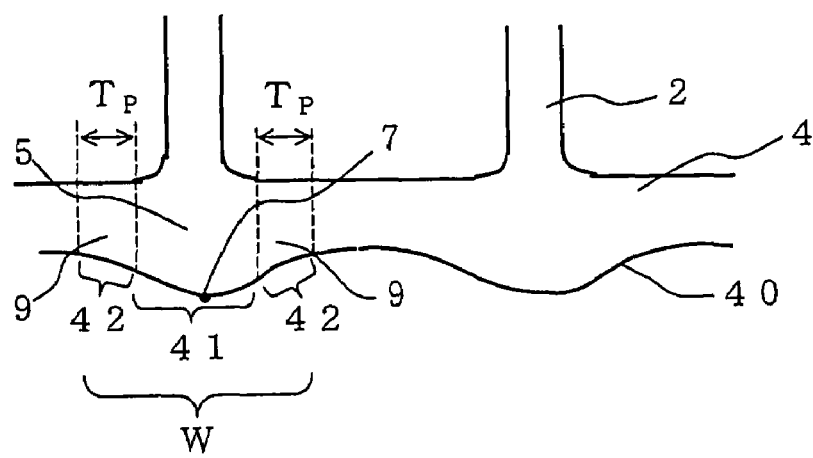
FIG. 9 is a partially enlarged schematic sectional view showing still another embodiment of the honeycomb structure of the present invention.

In FIG. 8 and FIG. 9 are shown still other forms of the concave and convex structure. There is also preferred a form such as shown in FIG. 8, in which a concave and convex structure is formed with the outer wall 4 having an almost constant thickness. It is also preferred that, as shown in FIG. 9, the partition wall 2 has a padding at the abutting portion 5. Even in such a case, it is sufficient that the convex top 7 is located in a range of "W" shown in FIG. 9.

In the present honeycomb structure, there is no particular restriction as to the sectional shape of cell as long as the sectional shape of cell is a polygon. The sectional shape of cell is preferably a square, a rectangle, a triangle or a hexagon and particularly preferably a square or a hexagon. The sectional shape of cell 3 need not be the same for all cells, and two or more different cell shapes may be present in one honeycomb structure. The average thickness (Tp) of partition walls needs to be 0.038 to 0.17 mm in order to achieve a small pressure loss and a small heat capacity; further, it is more preferably 0.038 to 0.10 mm, particularly preferably 0.038 to 0.092 mm. The average thickness (Ts) of outer wall needs to be 0.7 mm or less for increased thermal shock resistance; further, it is more preferably 0.6 mm or less, particularly preferably 0.5 mm or less. When it is too small, the strength is too small even when the above-mentioned structure is employed; therefore, Ts needs to be larger than Tp (the average thickness of partition walls) and is more preferably at least 1.3 times as large as Tp, particularly preferably at least 1.5 times as large as Tp.

There is no particular restriction as to the cell density. However, in considering that the honeycomb structure is used as a catalyst carrier, the cell density is preferably in a range of, for example, 15 to 233 cells/cm$^2$ (100 to 1,500 cells/in.$^2$). The sectional shape of the honeycomb structure per se may be various, for example, a circle, an ellipse, an oval (a race track shape) and a polygon. A circle, an ellipse and an oval are preferred. It is particularly preferable that the present invention is applied to a circular honeycomb structure because the slip in rotational direction can be inhibited.

There is no particular restriction as to the material for the honeycomb structure of the present invention. However, the material is preferred to be, for example, at least one kind of ceramic selected from the group consisting of cordierite, mullite, alumina, spinel, silicon carbide, silicon nitride, lithium aluminum silicate, aluminum titanate, zirconia and combinations thereof. Here, the silicon carbide includes a mixture of metallic silicon and silicon carbide. Of these, cordierite, which has a small thermal expansion coefficient and is suitably used as a material for honeycomb structure for purification of automobile engine exhaust gas, is particularly preferred in the present invention.

When the honeycomb structure of the present invention is used for purification of exhaust gas, it is preferred that it contains a catalyst which promotes the purification of harmful components present in the exhaust gas, such as nitrogen oxides, hydrocarbons and carbon monoxide. As the catalyst, there are mentioned, for example, an oxidation catalyst for oxidation of nitrogen oxides, a three way catalyst capable of simultaneously giving rise to oxidation of nitrogen oxides and reduction of hydrocarbons and carbon monoxide, and a nitrogen oxide (NOx) occlusion catalyst. Specifically explaining, there can be suitably used, as the oxidation catalyst, noble metals such as platinum (Pt), palladium (Pd), rhodium (Rh) and the like; as the three way catalyst, a platinum-rhodium mixture and a palladium-rhodium mixture; and as the nitrogen oxide occlusion catalyst, alkali metals [e.g. lithium (Li), sodium (Na), potassium (K) and cesium (Cs)] and alkaline earth metals [e.g. calcium (Ca), barium (Ba) and strontium (Sr)]. Besides the above-mentioned catalyst for exhaust gas purification, it may also contain, for example, a co-catalyst represented by an oxide of cerium (Ce) or zirconium (Zr) and a hydrocarbon absorber. These catalyst, co-catalyst, etc. are preferably loaded on the partition walls of the honeycomb structure.

The honeycomb structure of the present invention is preferred to be used particularly for purification of the exhaust gas emitted from an internal combustion engine of automobile or the like, but can also be used in various applications such as filter, catalyst carrier and the like. The honeycomb structure of the present invention can also be used as a honeycomb structure converter by canning it in a can. As the specific canning method, there are suitably used, for example, a stuffing method, a tourniquet method and a clamshell method.

As to the production method of the honeycomb structure of the present invention, there is no particular restriction. The present honeycomb structure can be produced, for example, by mixing powder of the above-mentioned material with a binder, etc., subjecting the mixture to injection, extrusion or the like to obtain a formed body of predetermined shape, and then drying and firing the formed body. Forming by extrusion is particularly preferred. During the forming, there is used a mold or a die both capable of giving a desired partition wall thickness, a desired outer wall thickness and a desired concave and convex structure, whereby the present honeycomb structure can be produced.

INDUSTRIAL APPLICABILITY

As described above, the honeycomb structure of the present invention is superior in thermal shock resistance and canning characteristic and can be suitably used, for example, as a catalyst carrier in the catalytic converter for purification of exhaust gas emitted from internal combustion engine (e.g. automotive engine).

What is claimed is:

1. A honeycomb structure comprising:
    a plurality of partition walls provided so as to form a plurality of cells extending in an axial direction of the honeycomb structure and having a polygonal section normal to the axial direction; and
    an outer wall surrounding said plurality of partition walls, wherein
    the partition walls have an average thickness (Tp) of 0.038 to 0.17 mm,
    the outer wall has an average thickness (Ts) satisfying a relation of Tp<Ts≦0.7 mm, and
    the outer wall has a concave and convex structure showing a concave and convex shape at its outer surface in the section of the honeycomb structure normal to the axial direction,
    a convex top being located at an outer surface of each of an abutting portion or an abutting portion vicinity,
    the abutting portion being a part of the outer wall where the partition wall abuts the outer wall,
    the abutting portion vicinity being a part of the outer wall present at each side of the abutting portion with a width of Tp.

2. The honeycomb structure according to claim 1, wherein a concave bottom is located at an outer surface of an intermediate portion, which is a part of the outer wall present between two neighboring abutting portions.

3. The honeycomb structure according to claim 1, wherein, in said section, the concave and convex structure satisfies a relation of 0.8 Cp<P<2.2 Cp, where "P" is a pitch from one convex top to the next convex top, and "Cp" is an average cell pitch from one partition wall to the next partition wall.

4. The honeycomb structure according to claim 1, wherein, in said section, the concave and convex structure satisfies a relation of 15 μm<h<Ts, where "h" is a height difference between one convex top and the adjacent concave bottom.

5. The honeycomb structure according to claim 3, wherein the concave and convex structure occupies at least 10% of the total length of the outer surface of the outer wall in said section.

6. The honeycomb structure according to claim 4, wherein the concave and convex structure occupies at least 10% of the total length of the outer surface of the outer wall in said section.

* * * * *